US012640940B2

(12) United States Patent
Zheng et al.

(10) Patent No.: US 12,640,940 B2
(45) Date of Patent: May 26, 2026

(54) SECURE ATTACHMENT SYSTEMS AND METHODS

(71) Applicant: Boost SubsciberCo L.L.C., Englewood, CO (US)

(72) Inventors: Borong Zheng, Littleton, CO (US); Dawood Shahdad, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 53 days.

(21) Appl. No.: 18/900,046

(22) Filed: Sep. 27, 2024

(65) Prior Publication Data

US 2026/0095337 A1 Apr. 2, 2026

(51) Int. Cl.
*H04L 9/32* (2006.01)
*H04W 12/037* (2021.01)
*H04W 12/72* (2021.01)

(52) U.S. Cl.
CPC ......... *H04L 9/3271* (2013.01); *H04W 12/037* (2021.01); *H04W 12/72* (2021.01)

(58) Field of Classification Search
None
See application file for complete search history.

(56) References Cited

U.S. PATENT DOCUMENTS

| | | | |
|---|---|---|---|
| 2016/0262015 A1 | 9/2016 | Lee et al. | |
| 2017/0332217 A1* | 11/2017 | Youtz | H04W 72/51 |
| 2018/0124597 A1 | 5/2018 | Malthankar et al. | |
| 2023/0224704 A1 | 7/2023 | Atarius et al. | |

OTHER PUBLICATIONS

3rd Generation Partnership Project Technical Specification Group Services and System Aspects; 3GPP System Architecture Evolution (SAE); Security architecture (Release 14), 3GPP Draft; 33401-E40, 3rd Generation Partnership Project (3GPP), Mobile Competence Centre Sep. 12, 2017.
International Search Report and Written Opinion received for PCT Patent Application No. PCT/US25/42417, mailed on Oct. 29, 2025, 11 pages.

* cited by examiner

*Primary Examiner* — William J. Goodchild
(74) *Attorney, Agent, or Firm* — Kipman T. Werking; Frontier IP Law PLLC

(57) ABSTRACT

A disclosed method may include receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI.

20 Claims, 9 Drawing Sheets

100

102

Start

104

Receiving a first International Mobile Subscriber Identity (IMSI) in an initial Non-Access Stratum (NAS) message

106

Establishing a second channel with the UE that is encrypted

108

Receiving a subsequent NAS message that includes a second IMSI that the mobile operator provisioned to the subscriber

110

Stop

SECURE ATTACHMENT SYSTEMS AND METHODS

BRIEF SUMMARY

This disclosure is generally directed to systems, methods, and computer-readable media relating to secure attachment in the context mobile telecommunications. The management of subscriber identity in mobile networks presents significant challenges, particularly during the initial attachment process. A concern in this context is the vulnerability of the International Mobile Subscriber Identity (IMSI) during the initial connection phase. In some systems, when a User Equipment (UE) attempts to connect to a mobile network for the first time, it transmits its IMSI in clear text within the initial Non-Access Stratum (NAS) message for authentication. This practice may expose the IMSI to potential security risks, including interception by malicious actors. The exposure of the IMSI may lead to various threats such as identity theft, unauthorized tracking of users, and potential impersonation attacks. These vulnerabilities are exacerbated by the increasing sophistication of cyber threats and the growing importance of mobile communications in both personal and professional contexts.

Current 3rd Generation Partnership Project (3GPP) methods for 4G networks, as defined in specifications like TS 33.401, do not provide protection for the IMSI during this initial attach procedure. The lack of encryption for the IMSI in the first NAS message creates a window of vulnerability that may be exploited by attackers using techniques such as IMSI catchers or man-in-the-middle attacks. This issue is particularly relevant in scenarios where users connect to networks in public spaces or areas with potentially compromised network infrastructure. The vulnerability of the IMSI during initial attachment not only poses risks to individual user privacy but also has broader implications for network security and the integrity of mobile communication systems as a whole.

IMSI catchers, also known as cell-site simulators or stingrays, may be devices that may mimic legitimate cellular base stations to interact with nearby mobile devices. These devices may potentially exploit certain characteristics of cellular network protocols to collect information about mobile users in a given area. The operation of IMSI catchers may leverage the fact that mobile devices are designed to automatically connect to the strongest available cellular signal, which may enable these devices to intercept communications between a mobile device and a legitimate network.

In some implementations, IMSI catchers may be capable of capturing various types of data from mobile devices within their range. This may potentially include the International Mobile Subscriber Identity (IMSI), which is a unique identifier assigned to each mobile subscriber. Additionally, some IMSI catchers might have the capability to intercept voice calls, text messages, or data transmissions, depending on their specific design and the security measures implemented in the target mobile network. The exact capabilities of these devices may vary widely, and may depend on factors such as the specific cellular technologies being targeted and the sophistication of the IMSI catcher's hardware and software.

The use of IMSI catchers may raise significant privacy and security concerns in the context of mobile telecommunications. These devices may potentially be used for unauthorized surveillance, potentially enabling an attacker to track the movements of specific individuals or gather information about all mobile devices in a particular area. In some scenarios, IMSI catchers might be used to conduct man-in-the-middle attacks, where the device intercepts and potentially alters communications between a mobile device and the legitimate network. This may potentially lead to the compromise of sensitive information or the injection of malicious data into the communication stream.

From a technical perspective, the effectiveness of IMSI catchers may be influenced by various factors related to cellular network protocols and mobile device behavior. For instance, the initial attach procedure in some cellular networks may involve the transmission of the IMSI in clear text, which may potentially make it easier for IMSI catchers to capture this identifier. Additionally, the tendency of mobile devices to prefer stronger signals may be exploited by IMSI catchers that broadcast at higher power levels than legitimate base stations. The specific vulnerabilities that IMSI catchers might exploit may vary depending on the cellular network generation (e.g., 2G, 3G, 4G, or 5G) and the particular implementation of network protocols.

The security implications of IMSI catchers may extend beyond the immediate privacy concerns related to unauthorized data interception. These devices may potentially be used to conduct denial-of-service attacks by preventing mobile devices from connecting to legitimate networks. In some scenarios, IMSI catchers might be employed to track the movements of individuals or groups, potentially infringing on personal privacy and freedom of movement. The use of these devices might also undermine user trust in mobile networks and potentially impact the adoption or usage patterns of mobile services.

As mobile networks continue to evolve and play an increasingly central role in various aspects of daily life and business operations, addressing this security gap becomes increasingly important for maintaining user trust and ensuring the overall resilience of mobile communication infrastructure. The rapid growth of Internet of Things (IoT) devices and the emergence of 5G networks further amplify the importance of securing the initial attachment process, as these technologies introduce new use cases and potential attack vectors that may exploit vulnerabilities in the current system.

To address these security challenges in the initial attachment process, a technique for secure initial attachment of a user equipment (UE) to a mobile network may be implemented. In some examples, this technique may introduce a two-stage International Mobile Subscriber Identity (IMSI) authentication process that enhances the security of the initial attachment procedure while maintaining compatibility with existing network architectures. The method may involve the use of an OEM IMSI, which is an embedded IMSI stored in the Mobile Equipment (ME) by the Original Equipment Manufacturer (OEM). This OEM IMSI may serve as a temporary identifier for the initial network attachment, effectively shielding the user's actual subscription information from potential interception.

In this example two-stage process, the UE first authenticates with the network using the OEM IMSI, establishing a secure channel between the UE and the network. The initial authentication using the OEM IMSI may follow standard protocols, enabling for seamless integration with existing network infrastructure. Once this secure channel is established, the UE may safely transmit the carrier IMSI, which is the actual IMSI associated with the user's subscription, through the encrypted channel. This technique effectively protects the carrier IMSI from potential interception during the vulnerable initial attachment phase, significantly reducing the risk of identity theft and unauthorized tracking.

The example two-stage authentication process occurs in a manner that is virtually transparent to the user, maintaining a smooth connection experience while enhancing security. From the user's perspective, the connection process remains unchanged, with no additional steps or input required. This transparency may be helpful for ensuring widespread adoption and user acceptance of the enhanced security measures. By implementing this method, mobile network operators may provide a more secure environment for their subscribers, addressing a vulnerability in current mobile communication systems without requiring significant changes to the overall network infrastructure.

This technique may be adapted for various types of mobile devices, including smartphones, IoT devices, and future mobile technologies, offering a flexible solution that may evolve with changing network technologies and security requirements. The adaptability of the two-stage authentication process is particularly important in the context of the rapidly evolving mobile ecosystem, where new device types and network technologies are constantly emerging. The method may be implemented across different generations of mobile networks, from 4G LTE to 5G and beyond, providing a consistent security technique across various network environments.

The use of the OEM IMSI as an initial identifier also provides an additional layer of privacy, as it is not directly linked to the user's actual subscription, further complicating potential tracking or profiling attempts by malicious actors. This separation between the OEM IMSI and the carrier IMSI creates a form of identity compartmentalization, making it more difficult for attackers to associate network activities with specific individuals. The OEM IMSI may be designed to contain minimal information, further reducing the potential impact of its interception during the initial attachment phase.

In some examples, the two-stage International Mobile Subscriber Identity (IMSI) authentication process may be implemented using existing cryptographic protocols and key management systems, enabling for efficient integration with current network security frameworks. This technique may ensure that the enhanced security measures build upon well-established and thoroughly tested cryptographic foundations, minimizing the risk of introducing new vulnerabilities.

By addressing the security vulnerabilities in the initial attachment process, this technique may contribute to the overall resilience and trustworthiness of mobile communication systems. Enhanced security during initial attachment may have cascading benefits throughout the network, potentially reducing the success rate of various attack vectors and improving the overall security posture of mobile communications. This improvement in security may lead to increased user confidence in mobile services, potentially driving adoption of new mobile technologies and services that rely on secure and private communications.

In some examples, a method includes (i) receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI, (ii) establishing, by the server of the mobile operator based on the first IMSI in the initial NAS message, a second channel with the UE that is encrypted, and (iii) receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

In some examples, establishing the second channel based on the first IMSI comprises deriving, by the server of the mobile operator, encryption and integrity keys based on the first IMSI for use in establishing the second channel.

In some examples, the subsequent NAS message is encrypted using the encryption keys derived from the first IMSI.

In some examples, the first IMSI is not linked to any subscribed services in the mobile operator's subscriber database.

In some examples, the second channel is established in compliance with the 3rd Generation Partnership Project (3GPP) TS 33.401 specification.

In some examples, the method is performed by s a Mobility Management Entity (MME) for 4G networks or a Serving GPRS Support Node (SGSN) for 3G networks.

In some examples, the method further comprises maintaining, by the mobile operator, a database of valid OEM IMSIs and their associated security credentials and validating, by the mobile operator, the first IMSI received in the initial NAS message against the database as a condition for establishing the second channel.

In some examples, the method further comprises performing an authentication process, by the server of the mobile operator, comprising: generating a random challenge for authenticating the UE using the first IMSI or the second IMSI, sending the random challenge to the UE, receiving a response from the UE, and authenticating the UE based on the response such that successful authentication results in establishing the second channel for the first IMSI or maintaining the second channel for the second IMSI.

In some examples, the authentication process further comprises computing, by the server of the mobile operator, an expected response (XRES) based on the random challenge and a secret key associated with the first International Mobile Subscriber Identity (IMSI) or the second IMSI.

In some examples, the authentication process complies with the Authentication and Key Agreement (AKA) protocol.

In some examples, the method further comprises generating, by the server of the mobile operator, a new set of security keys based on the second IMSI after receiving the subsequent NAS message.

In some examples, the user equipment (UE) includes an embedded SIM (eSIM) supporting multiple profiles and the first IMSI and the second IMSI are assigned to different profiles on the eSIM.

In some examples, the first IMSI is stored in one of: Mobile Equipment of the UE, an embedded SIM (eSIM) of the UE, or a physical SIM card of the UE.

In some examples, the first IMSI is embedded in the Mobile Equipment.

In some examples, the initial Non-Access Stratum (NAS) message containing the first IMSI is sent in unencrypted clear text in compliance with the initial attach procedure defined in the 3GPP TS 33.401 specification for 4G networks or the 3GPP TS 33.102 specification for 3G networks.

In some examples, the method further comprises performing, by the server of the mobile operator, a security mode command exchange with the UE to establish integrity protection for subsequent communications.

In some examples, a non-transitory computer-readable medium has instructions stored thereon that, when executed by at least one physical computing processor, cause a computing device to perform operations comprising (i) receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI, (ii) establishing, by the server of the mobile operator based on the first IMSI in the initial NAS message, a second channel with the UE that is encrypted, and (iii) receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

In some examples, a system comprises at least one physical computing processor of a computing device and a non-transitory computer-readable medium that has instructions stored thereon that, when executed by the at least one physical computing processor, cause the computing device to perform operations comprising (i) receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI, (ii) establishing, by the server of the mobile operator based on the first IMSI in the initial NAS message, a second channel with the UE that is encrypted, and (iii) receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current disclosure. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
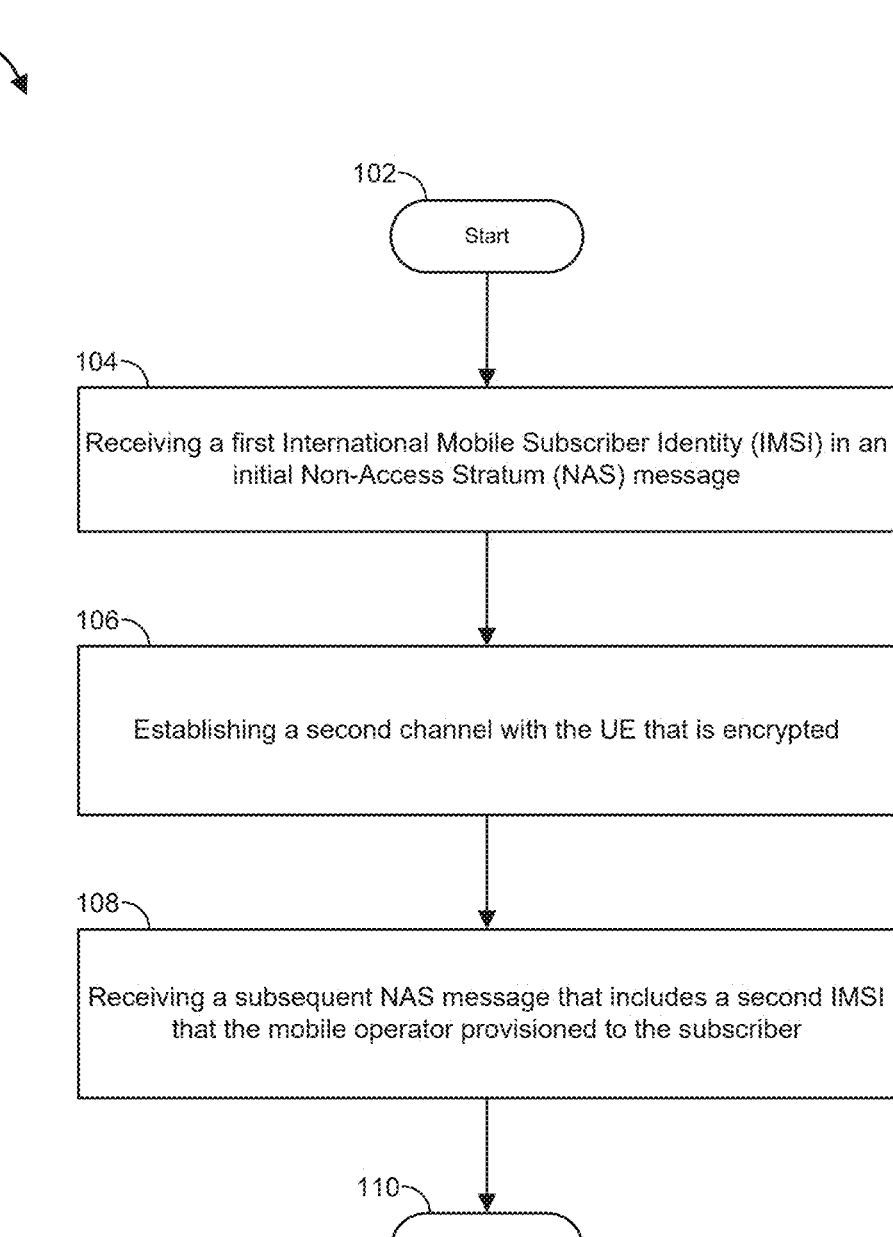
FIG. 1 illustrates a flowchart of a method for secure initial attachment of a User Equipment (UE) to a mobile network, in accordance with an embodiment of the present disclosure.

FIG. 1 shows a flow diagram for a method 100 relating to secure attachment for mobile devices. At step 102, method 100 may start. At step 104, method 100 may include receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI. At step 106, method 100 may include establishing, by the server of the mobile operator based on the first IMSI in the initial NAS message, a second channel with the UE that is encrypted. At step 108, method 100 may include receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber. At step 110, method 100 may stop.

By way of background, The International Mobile Subscriber Identity (IMSI) is a unique identifier used in mobile networks to distinguish individual subscribers. Described by the International Telecommunication Union (ITU) in the E.212 recommendation, an IMSI is typically a 15-digit number, though it may be shorter in some cases. The structure of an IMSI comprises three main parts: the Mobile Country Code (MCC), the Mobile Network Code (MNC), and the Mobile Subscription Identification Number (MSIN).

The MCC is a three-digit code that identifies the country of the mobile subscriber's home network. For example, 310 represents the United States, 234 represents the United Kingdom, and 460 represents China. The MNC is typically a two or three-digit code (depending on the country) that identifies the specific mobile network operator within a country. The combination of MCC and MNC is often referred to as the Home Network Identity (HNI). The remaining digits form the MSIN, which is the unique identifier assigned by the operator to the individual subscriber.

IMSIs play a role in mobile network operations, particularly in subscriber authentication and mobility management. When a mobile device attempts to connect to a network, it may need to provide its IMSI to identify itself. This process occurs during various procedures, such as initial network attachment, location updates, and handovers between different networks or technologies.

The IMSI is typically stored securely on the Subscriber Identity Module (SIM) card in the mobile device. In more recent implementations, it may be stored in an embedded SIM (eSIM) or in the device's secure element. The mobile device does not usually know its own IMSI; instead, it reads this information from the SIM when needed for network procedures.

From a security perspective, the IMSI is considered sensitive information. If intercepted, it may potentially be used to track a user's movements or, in some cases, to impersonate the user on the network. In the context of the two-stage authentication method described in this disclosure, two different IMSIs may be utilized: an OEM IMSI and a carrier IMSI. The OEM IMSI, embedded by the Original Equipment Manufacturer (OEM), serves as a temporary identifier for the initial network attachment. It may not be associated with any specific subscriber or services. The carrier IMSI, on the other hand, is the actual subscriber identity provisioned by the mobile operator and linked to the user's account and services.

By way of background, Non-Access Stratum (NAS) messages contribute to the communication between User Equipment (UE) and the core network in mobile telecommunications systems. These messages are part of the control plane and may be used for managing various non-radio aspects of the connection between a mobile device and the network. NAS protocols operate at a higher layer than the radio access technologies, which may enable for consistency across different types of radio networks.

In 4G LTE networks, NAS messages may be exchanged between the UE and the Mobility Management Entity (MME) in the core network. These messages may be used for several functions, including mobility management, session management, and identity management. Mobility management functions handled by NAS may include tasks such as attaching to the network, tracking area updates, and paging procedures. Session management, on the other hand, may deal with establishing, maintaining, and releasing Packet Data Network (PDN) connections, which may enable the UE to access internet services.

NAS messages may be used in the initial attachment procedure, where the UE first connects to the network. During this process, the UE may send its International Mobile Subscriber Identity (IMSI) to the network as part of an initial NAS message. This step may be significant from a security perspective, as it may represent a potential vulnerability if the IMSI is transmitted in clear text. In some systems, this initial NAS message containing the IMSI may be sent unencrypted, which is one of the security issues that may be addressed by the two-stage authentication method described in this disclosure.

NAS messages may also be involved in the security setup between the UE and the network. After the initial authentication, subsequent NAS messages may be encrypted and integrity-protected using keys derived during the authentication process. This may help ensure the confidentiality and integrity of sensitive control information exchanged between the UE and the core network. The security context established for NAS messaging may be separate from that used for user plane data, which may provide an additional layer of protection for control information.

In the context of the two-stage IMSI authentication method described in this disclosure, NAS messages may be utilized in both stages of the process. The initial NAS message may carry the OEM IMSI, while a subsequent NAS message, transmitted over the secure channel established in the first stage, may carry the carrier IMSI. This technique may leverage the existing NAS protocol structure while potentially enhancing its security properties, illustrating how innovations in security may be implemented within the framework of established network protocols.

By way of background, User Equipment (UE) is a term used in mobile telecommunications for devices that connect to mobile networks. These devices may include smartphones, tablets, mobile hotspots, IoT devices, and other equipment capable of cellular communication. In the context of network protocols and specifications, UE is the formal term used to describe any device that may connect to and communicate with a mobile network. The architecture of a UE may be complex, typically consisting of both hardware and software components. On the hardware side, a UE may include various elements such as a baseband processor, which may handle cellular communication protocols and signal processing; an application processor, which may run the device's operating system and applications; radio frequency (RF) components, including antennas and transceivers, which may transmit and receive cellular signals; a Subscriber Identity Module (SIM) or embedded SIM (eSIM), which may store subscriber information including the International Mobile Subscriber Identity (IMSI); memory and storage components for data and application storage; and various sensors and input/output interfaces.

On the software side, a UE may run an operating system and include a protocol stack that implements various cellular communication standards. This stack may include layers for physical communication, data link protocols, and higher-level network protocols. The complexity of this software architecture enables UEs to manage a wide range of functions necessary for cellular communication, including network discovery and selection, registration and authentication with the network, mobility management, session management for data connectivity, Quality of Service (QoS) management, and power management to optimize battery life.

UEs may support multiple Radio Access Technologies (RATs), enabling them to connect to different generations of mobile networks depending on availability and network conditions. This multi-RAT capability may enable seamless connectivity as users move between areas with different network coverage. The ability to switch between different RATs involves complex decision-making processes within the UE, taking into account factors such as signal strength, network congestion, and power consumption.

The security capabilities of UEs are one part of their design and functionality. UEs may incorporate various security features, both in hardware and software, to protect user data and ensure secure communication with the network. These may include secure elements or trusted execution environments for storing sensitive information, cryptographic modules for encrypting and decrypting data, and software implementations of security protocols. UEs may perform complex cryptographic operations necessary for secure communication, including key derivation, encryption and decryption of messages, and integrity protection. The implementation of these security features may vary depending on the specific requirements of different mobile network standards and the capabilities of individual UE models.

Figure 2:
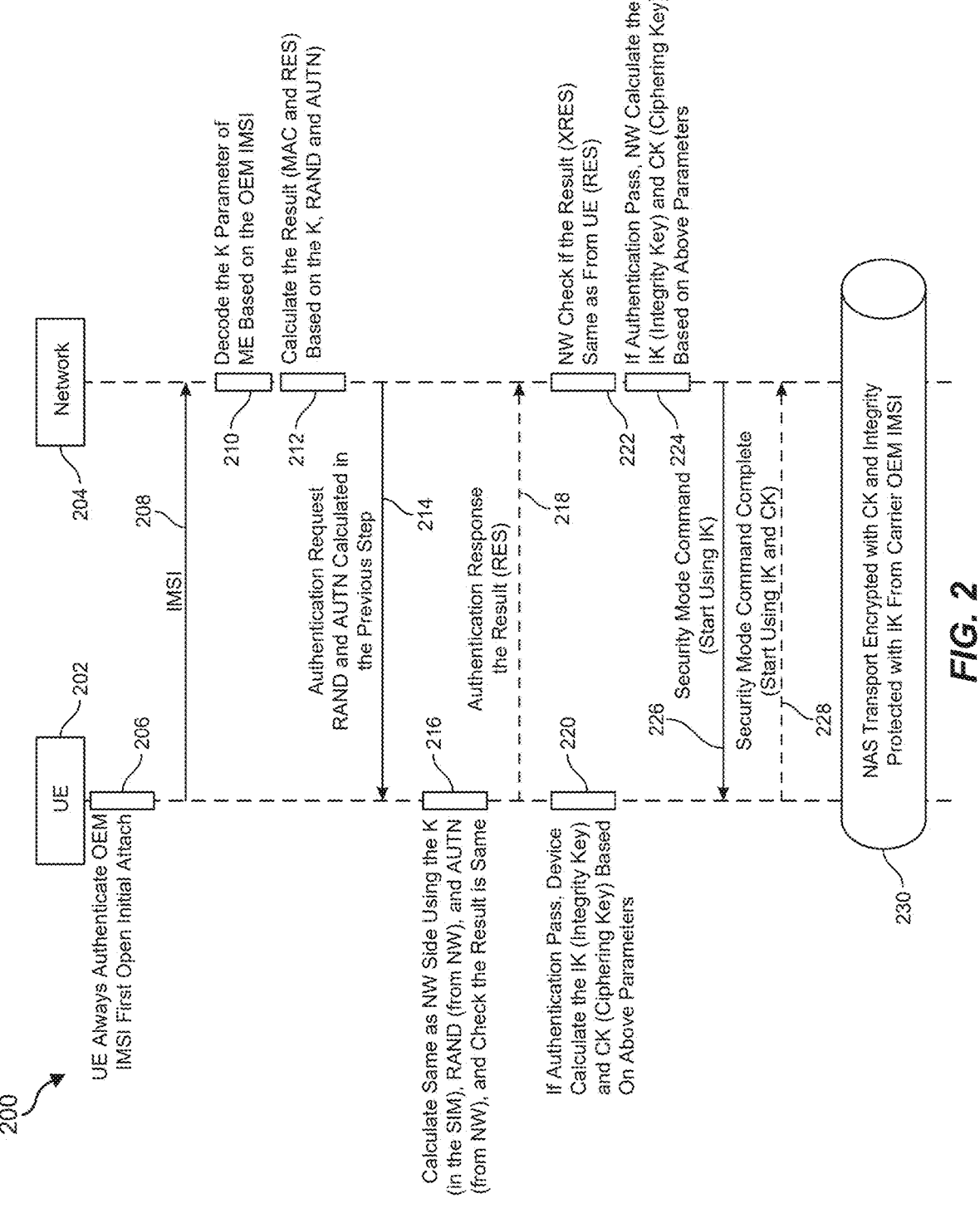
FIG. 2 shows a timing diagram of a first stage of a two-stage IMSI authentication process, depicting the interactions between a UE and a network using an OEM IMSI, in accordance with an embodiment of the present disclosure.

FIG. 2 illustrates a timing diagram 200 of a first stage of an example two-stage IMSI authentication process, the timing diagram depicting interactions between a User Equipment (UE) 202 and a network 204. This figure may provide a view of an initial authentication process using an OEM IMSI, which may form a foundation for establishing a secure channel for subsequent communication. The two-stage IMSI authentication process may represent an improvement in mobile network security, potentially addressing vulnerabilities that may be present in other single-stage authentication methods. By potentially leveraging an OEM IMSI as an initial identifier, this technique might introduce an additional layer of protection for the subscriber's actual IMSI, potentially mitigating risks associated with possible interception or unauthorized access during the initial attachment phase.

The process may begin with UE 202 authenticating the OEM IMSI first during an initial attach procedure. At step 206, UE 202 might initiate an open initial attach process. This step may involve UE 202 sending the OEM IMSI to network 204, as indicated by the arrow at step 208. The OEM IMSI, which may be embedded in the Mobile Equipment by the Original Equipment Manufacturer (OEM), may serve as a temporary identifier that might not expose the subscriber's actual IMSI. Additionally, or alternatively, in other examples the substitute IMSI may be provided by an entity other than the OEM. The concept of an OEM IMSI may represent a departure from other mobile authentication protocols. Unlike a carrier-provisioned IMSI, which may be directly linked to a subscriber's account and services, the OEM IMSI might be a pre-embedded identifier that may not be associated with any specific subscription. This separation may potentially provide an additional layer of privacy and security, as the interception of the OEM IMSI during the initial attachment phase might not yield actionable information about the subscriber's identity or service profile. The use of an OEM IMSI may also enable for a standardized initial authentication process across different devices from the same manufacturer, potentially simplifying network management and possibly improving interoperability.

Upon receiving the OEM IMSI, network 204 may proceed to decode a K parameter of the Mobile Equipment based on the received OEM IMSI at step 210. This K parameter may be a secret key associated with the OEM IMSI, which might be used for authentication and key derivation. The K parameter may play a role in the authentication process, potentially serving as a root of trust for subsequent cryptographic operations. In the context of mobile network security, the K parameter may be a 128-bit or 256-bit value that might be securely stored in both the UE and the network's authentication center. The security of the authentication process may rely on the confidentiality of this K parameter, as its compromise may potentially enable an attacker to impersonate the UE or the network. In the case of the OEM IMSI authentication, the K parameter associated with the OEM IMSI might be managed differently from traditional carrier-provisioned K parameters, potentially involving collaboration between device manufacturers and network operators to potentially ensure secure distribution and storage of these keys.

Following this, at step 212, network 204 may calculate a result, which may include a Message Authentication Code (MAC) and an expected response, based on the decoded K parameter, a random challenge (RAND), and an authentication token (AUTN). This calculation might be a part of the Authentication and Key Agreement (AKA) protocol, which may be used in mobile networks to potentially provide mutual authentication between the UE and the network, as well as to possibly establish session keys for securing subsequent communications. The AKA protocol may be designed to resist various types of attacks, potentially including replay attacks and man-in-the-middle attacks, by possibly using fresh random challenges (RAND) and sequence numbers (part of AUTN) in each authentication process. The MAC, which might be implemented using a keyed hash function, may provide integrity protection for the authentication messages, potentially ensuring that they have not been tampered with during transmission. The RES, on the other hand, may be a response value that the UE might need to correctly calculate to potentially prove its knowledge of the shared secret K parameter, thereby potentially authenticating itself to the network.

By way of background, the Authentication and Key Agreement (AKA) protocol may refer to a security mechanism used in mobile telecommunications networks. This protocol may be used to provide mutual authentication between a user's mobile device, often referred to as User Equipment (UE), and the network. The AKA protocol may also facilitate the generation of cryptographic keys that may be used to protect the confidentiality and integrity of communications between the UE and the network. The implementation of AKA may vary across different generations of mobile networks, with specific versions tailored for 3G, 4G, and 5G systems, though the core principles may remain consistent.

In a typical AKA procedure, the process may begin when a user equipment (UE) attempts to connect to a network. The network may send a challenge to the UE, which may include a random number (RAND) and an authentication token (AUTN). The UE may then use this information, along with a secret key stored securely in its Security Information Management (SIM) or Universal Subscriber Identity Module (USIM), to perform a series of cryptographic operations. These operations may result in the generation of a response (RES) that the UE sends back to the network. Concurrently, the network may perform similar calculations using its own copy of the UE's secret key. If the response from the UE matches the network's calculated expected response (XRES), the UE may be considered authenticated. This process may also enable the UE to authenticate the network, providing mutual authentication.

One of the features of the AKA protocol may be its ability to generate session keys that may be used for encrypting and protecting the integrity of subsequent communications. These keys may be derived using the same cryptographic operations that generate the authentication response. By basing the key generation on a combination of long-term secrets and session-specific random values, the AKA protocol may provide a robust method for creating unique keys for each connection session. This technique may help to ensure that even if one session is compromised, the security of past and future sessions may remain intact.

The AKA protocol may incorporate measures to protect against various types of attacks. For instance, the use of sequence numbers in the authentication token (AUTN) may help prevent replay attacks, where an attacker might attempt to reuse a previously captured authentication message. The protocol may also include provisions for re-synchronization in cases where the sequence numbers between the UE and the network become misaligned. These features may contribute to the overall resilience of the authentication process in the face of potential security threats.

Network 204 may then send an authentication request to UE 202 at step 214. This request may include the RAND and AUTN values calculated in the previous step. The RAND might be a random challenge generated by the network for each authentication process, potentially ensuring the freshness of the authentication and possibly preventing replay attacks. The AUTN token may contain information that may enable the UE to authenticate the network, potentially including a sequence number to possibly prevent replay attacks and a MAC to potentially ensure the integrity and authenticity of the authentication request.

UE 202 may receive this authentication request and process it at step 216. During this step, UE 202 may calculate the same parameters as the network side using the K value potentially stored by the SIM or OEM, along with the received RAND and AUTN values. UE 202 might then check if its calculated result matches the one received from the network. This process may involve several cryptographic operations, potentially including verifying the Message Authentication Code (MAC) in the AUTN to possibly authenticate the network, checking the sequence number to potentially ensure the freshness of the authentication request, and calculating the RES value to possibly prove its own identity to the network, which can be sent at a step 218.

If the authentication is successful, UE 202 may calculate an Integrity Key (IK) and Ciphering Key (CK) based on the above parameters at step 220. These keys may be used for establishing the secure communication channel. The derivation of the IK and CK might be performed using standardized key derivation functions, which may take as input the K parameter, RAND, and potentially other values to generate session-specific keys. Concurrently, at step 222, network 204 might check if the result (XRES) it calculated matches the response (RES) received from UE 202. If this check is successful, network 204 may also calculate the IK and CK at step 224, potentially mirroring the process performed by UE 202. This parallel key derivation on both sides of the communication may ensure that UE 202 and network 204 end up with the same set of session keys without ever having to transmit these sensitive keys over the air interface.

By way of background, Ciphering and Integrity Keys may play a significant role in securing communications within mobile networks. These keys may be cryptographic elements used to protect the confidentiality and integrity of data transmitted between User Equipment (UE) and the network infrastructure. The generation, distribution, and application of these keys may form a part of the overall security architecture in mobile telecommunications systems, potentially contributing to the protection of user data and network signaling messages from unauthorized access or manipulation.

In mobile network security protocols, the Ciphering Key (CK) may be used to encrypt the data transmitted over the air interface, which may help prevent eavesdropping by potential attackers. This encryption process may involve complex mathematical algorithms that may transform plaintext data into ciphertext, which may be unintelligible to anyone without the correct key. The strength of this protection may depend on various factors, including the length of the key and the specific encryption algorithm employed. Mobile networks may use standardized encryption algorithms, which may be subject to rigorous security analysis and may be updated over time to address evolving security requirements.

The Integrity Key (IK), on the other hand, may be used to ensure that the transmitted data has not been altered during transmission. This integrity protection may be helpful for detecting any unauthorized modifications to the data, which may potentially be attempted by malicious actors. The integrity protection process may involve generating a unique code or tag for each message, which may be verified by the recipient. If the integrity check fails, the receiving entity may discard the message, potentially preventing the use of tampered data.

The generation of Ciphering and Integrity Keys may often be tied to the authentication process. In many mobile network implementations, these keys may be derived as part of the Authentication and Key Agreement (AKA) protocol. During this process, both the UE and the network may independently generate the same set of keys based on shared secret information and random challenges. This technique may ensure that both ends of the communication have the same keys without needing to transmit the actual key material over the potentially insecure air interface.

Mobile networks may employ a hierarchical key structure, where the Ciphering and Integrity Keys are derived from higher-level keys. For instance, in 4G LTE networks, the CK and IK may be used to derive a Key Access Security Management Entity (KASME), which in turn may be used to generate further keys for specific purposes, such as encrypting the Non-Access Stratum (NAS) signaling messages or protecting the Radio Resource Control (RRC) signaling. This hierarchical technique may enable for finegrained key separation, potentially enhancing security by limiting the impact of a single key compromise.

The management of Ciphering and Integrity Keys throughout the lifecycle of a mobile connection may involve complex procedures. These may include key refresh mechanisms, where new keys are generated periodically or in response to certain events, such as handovers between different cells or network elements. Such key refresh procedures may help maintain the security of the communication by limiting the amount of data encrypted with any single key, which may reduce the risk of cryptanalysis attacks.

The authentication process may conclude with a security mode command exchange. Network 204 might send a security mode command to UE 202 at step 226, potentially instructing it to start using the derived Integrity Key (IK). UE 202 may respond with a security mode command complete message at step 228, possibly confirming that it is now using both the Integrity Key (IK) and the Ciphering Key (CK).

Finally, at step 230, a secure NAS transport channel may be established between UE 202 and network 204. This channel may be encrypted with the Ciphering Key (CK) and potentially protected for integrity using the Integrity Key (IK) derived from the OEM IMSI authentication process. The Non-Access Stratum (NAS) may be a set of protocols in mobile networks that may handle the non-radio aspects of the communication between the user equipment (UE) and the core network. By potentially securing the NAS transport channel, the system might ensure that subsequent signaling messages, potentially including those containing sensitive information like the carrier International Mobile Subscriber Identity (IMSI), may be protected against possible eavesdropping and tampering. This secure channel may provide a protected environment for the subsequent transmission of the carrier IMSI, as might be described in relation to FIG. 3. The establishment of this secure channel may mark the completion of the first stage of the two-stage authentication process, potentially setting the stage for the secure transmission of the carrier IMSI and the possible establishment of the subscriber's actual network connection.

In some examples of method 100, the second channel is established in compliance with the 3GPP TS 33.401 specification. The 3GPP TS 33.401 specification defines security procedures for Evolved Packet System (EPS), which includes Long Term Evolution (LTE) and System Architecture Evolution (SAE) networks. This specification outlines the protocols and mechanisms for ensuring the confidentiality and integrity of communications in 4G networks. By establishing the second channel in compliance with this specification, the method ensures that industry-standard security measures are implemented. This includes the use of specific encryption algorithms, key derivation functions, and integrity protection mechanisms that have been thoroughly vetted by the telecommunications industry. Compliance with this specification also ensures interoperability with existing network infrastructure and devices, enabling for seamless integration of the two-stage IMSI authentication process into current 4G network deployments.

In some examples, method 100 is performed by a Mobility Management Entity (MME) for 4G networks or a Serving GPRS Support Node (SGSN) for 3G networks. The Mobility Management Entity (MME) is a control-node for the LTE access network, handling functions related to bearer management and connection management. In the context of this method, the MME may be responsible for processing the initial NAS message containing the OEM IMSI, validating it, and orchestrating the establishment of the secure channel.

For 3G networks, the Serving GPRS Support Node (SGSN) performs similar functions. The SGSN is responsible for the delivery of data packets from and to the mobile stations within its geographical service area. By implementing this method in the MME or SGSN, the two-stage IMSI authentication process may be integrated into existing network architectures without requiring significant changes to other network elements or the overall network topology.

In some embodiments of method 100, the initial NAS message containing the first IMSI is sent in unencrypted clear text in compliance with the initial attach procedure defined in the 3GPP TS 33.401 specification for 4G networks or the 3GPP TS 33.102 specification for 3G networks. The initial attach procedure, as defined in the 3GPP specifications, requires the first NAS message to be sent in clear text. This is because, at this stage, no security context has yet been established between the UE and the network. For 4G networks, the TS 33.401 specification outlines this procedure, while for 3G networks, it is described in the TS 33.102 specification. By sending the OEM IMSI in clear text during this initial step, the method maintains compatibility with these established protocols. However, unlike related methods where the subscriber's actual IMSI would be exposed, method 100 would only reveal the temporary OEM IMSI.

Figure 3:
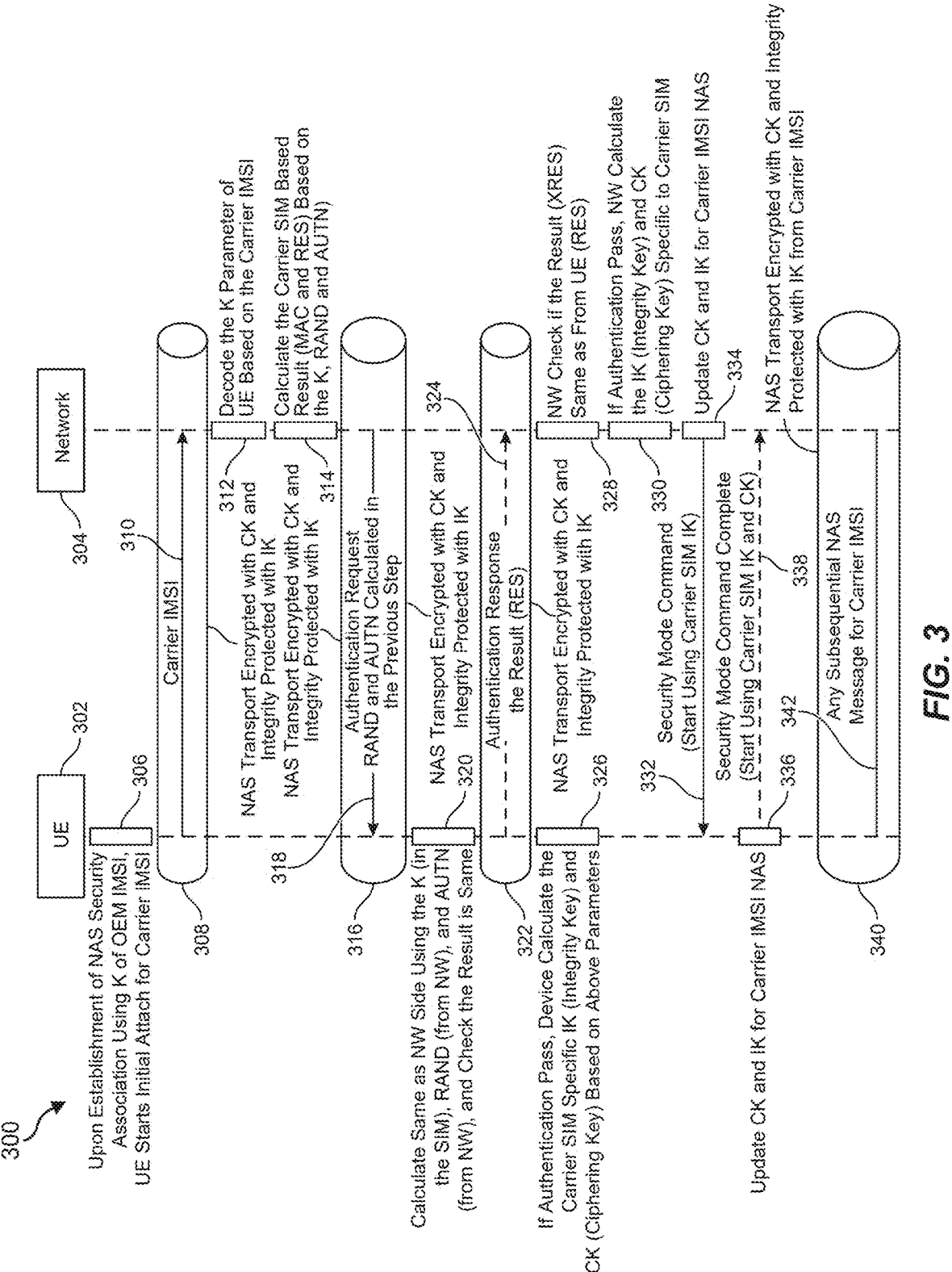
FIG. 3 presents a timing diagram of a second stage of the two-stage IMSI authentication process, illustrating the interactions between the UE and the network using a carrier IMSI, in accordance with an embodiment of the present disclosure.

FIG. 3 presents a timing diagram 300 of a second stage of an example two-stage IMSI authentication process, the timing diagram illustrating interactions between a User Equipment (UE) 302 and a network 304. This figure may provide a view of how the carrier IMSI is securely transmitted and authenticated, following the initial authentication using the OEM IMSI as depicted in FIG. 2.

The process may begin at step 306, where upon establishment of a NAS security association using the K parameter of the OEM IMSI, UE 302 might initiate an initial attach procedure for the carrier IMSI. This step may involve UE 302 sending the carrier IMSI to network 304, as potentially indicated by the arrow at step 310. The carrier IMSI, which may be provided and provisioned by the mobile carrier, may be transmitted within the NAS transport encrypted with the Ciphering Key (CK) and protected for integrity with the Integrity Key (IK) derived during the OEM IMSI authentication process, as indicated by the cylinder 308.

Upon receiving the encrypted carrier IMSI, network 304 may proceed to decode the K parameter of the UE based on the carrier IMSI at step 312. This K parameter may be a secret key associated with the carrier IMSI, which might be used for authentication and key derivation specific to the subscriber's actual account. At step 314, network 304 might calculate the carrier SIM-based result, which may include a Message Authentication Code (MAC) and an expected response (RES), based on the decoded K parameter, a random challenge (RAND), and an authentication token (AUTN).

Network 304 may then send an authentication request to UE 302 at step 318, transmitted within the secure NAS transport channel as indicated by cylinder 316. This request may include the RAND and AUTN values calculated in the previous step. UE 302 might receive this authentication request and process it at step 320. During this step, UE 302 may calculate the same parameters as the network side using the K value stored in itself, along with the received RAND and AUTN values. UE 302 may then check if its calculated result matches the one received from the network. This can further trigger the authentication response (RES) to be sent at a step 324.

If the authentication is successful, UE 302 might calculate the carrier SIM-specific Integrity Key (IK) and Ciphering Key (CK) based on the above parameters at step 326. These keys may be used for establishing the final secure communication channel. Concurrently, at step 328, network 304 may check if the result (XRES) it calculated matches the response (RES) received from UE 302. If this check is successful, network 304 might also calculate the IK and CK specific to the carrier SIM at step 330.

At step 334, network 304 may update the Ciphering Key (CK) and the Integrity Key (IK) for the carrier IMSI NAS communications. An arrow 332 might indicate that a security mode command is transmitted to UE 302, potentially instructing it to start using the carrier SIM IK. At step 336, UE 302 may update the Ciphering Key (CK) and the Integrity Key (IK) for the carrier IMSI NAS communications. An arrow 338 may indicate that a security mode command complete message is sent, confirming that UE 302 is now using both the carrier SIM IK and CK.

Finally, at step 340, a secure NAS transport channel may be established between UE 302 and network 304 for any subsequent NAS messages related to the carrier IMSI. This channel, represented by cylinder 340, may be encrypted with the Ciphering Key (CK) and potentially protected for integrity using the Integrity Key (IK) derived from the carrier IMSI authentication process, as indicated by the horizontal line 342.

This second stage of the authentication process might build upon the security established in the first stage, potentially providing an additional layer of protection for the subscriber's actual IMSI and associated communications. By transmitting the carrier IMSI over an already secured channel and performing a second round of authentication, the system may enhance the overall security of the network attachment process. This technique may potentially mitigate risks associated with IMSI interception and unauthorized access to subscriber information, as the actual subscriber identity is not exposed during the initial, more vulnerable stage of network attachment.

Figure 4:
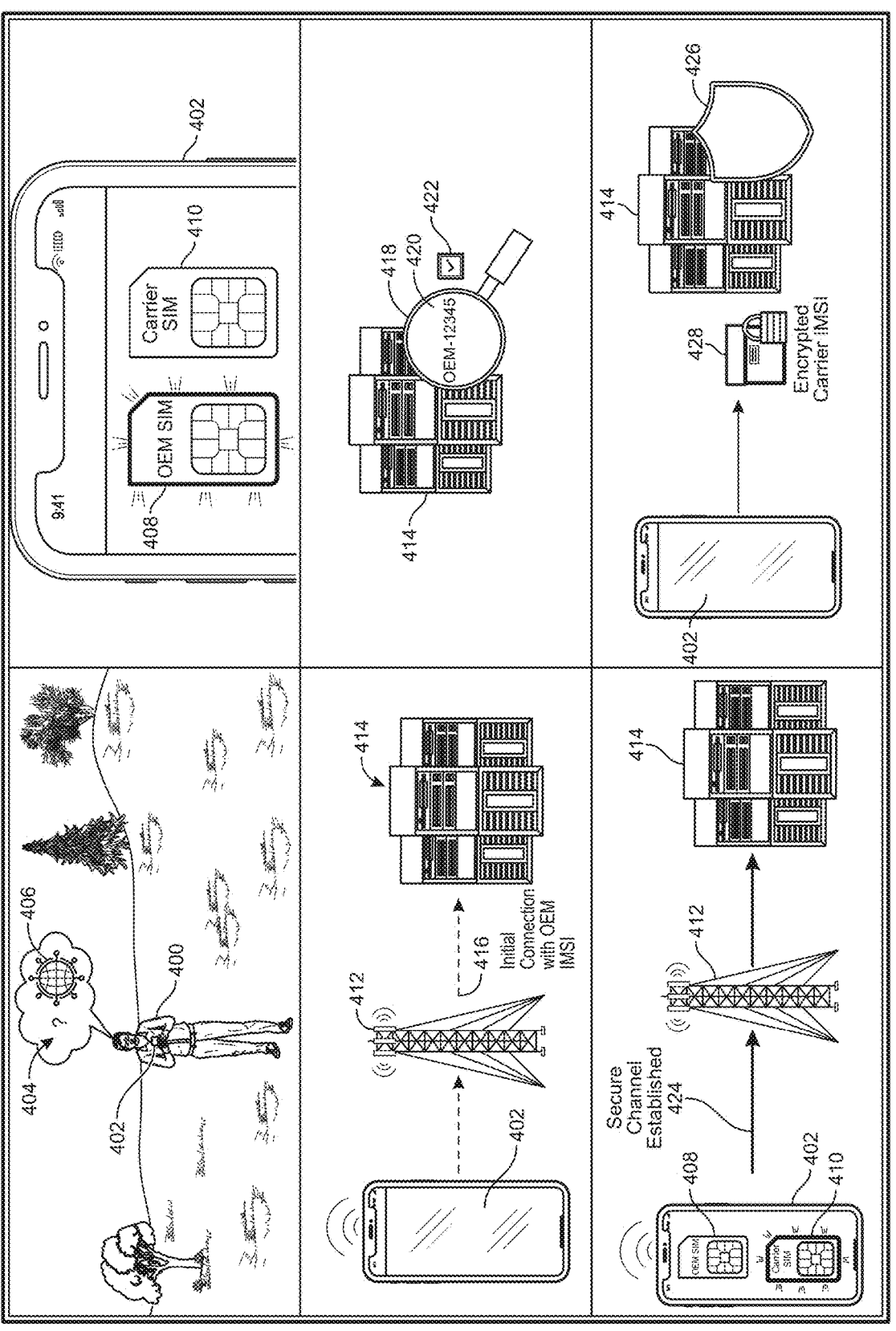
FIG. 4 depicts a comic-style multi-panel illustration of the two-stage IMSI authentication process, visually representing the enhanced security provided by the invention, in accordance with an embodiment of the present disclosure.

FIG. 4 presents a multi-panel illustration of an example two-stage IMSI authentication process, potentially offering a visual representation of the enhanced security that may be provided. This figure depicts the process in a series of panels, each highlighting different aspects of the secure initial attachment procedure.

In the top-left panel, a person 400 is shown holding a smartphone 402. The individual's expression appears slightly confused or concerned. Above the person's head, a large thought bubble is visible. Within this thought bubble, a question mark symbol 404 is drawn on the left side, while a simplified network icon 406 is positioned on the right side. Network icon 406 resembles a globe with interconnecting lines, potentially symbolizing the complex nature of mobile network infrastructures and the various connection points a device may encounter.

The top-right panel offers a zoomed-in view of the smartphone screen 402. This panel focuses on illustrating the dual IMSI concept. In this example, the OEM IMSI may be stored in a SIM card, while in other examples the OEM IMSI may be stored in the Mobile Equipment. In the top-right panel two SIM card icons are prominently displayed side by side on the screen. The left SIM card icon is labeled "OEM SIM" 408, while the right SIM card icon is labeled "Carrier SIM" 410. Around OEM SIM 408, a bright, glowing outline is drawn, created using a series of short lines radiating outward. This glow effect may indicate that OEM SIM 408 is active and in use during the initial stage of the authentication process. The visual distinction between the two SIM icons may emphasize the separation between the OEM IMSI and the carrier IMSI, which may be an aspect of the enhanced security technique.

In the middle-left panel, a simplified network diagram is presented. On the far left of this panel, the same smartphone 402 from the previous panels is shown. Several curved lines emanate outward from the top of smartphone 402, representing signal waves. In the center of the panel, a tall cellular tower 412 with multiple antennas at the top is depicted. On the right side of the panel, a group of three computer server racks 414 is illustrated, representing the mobile operator's network infrastructure. A dashed line is drawn starting from smartphone 402, going to cellular tower 412, and then to server racks 414. This line is labeled "Initial connection with OEM IMSI" 416. The use of a dashed line for this initial connection may visually represent the potentially vulnerable nature of this first communication, which may be sent in clear text.

The middle-right panel focuses on server racks 414 from the previous panel. In front of these server racks, a large magnifying glass 418 is drawn. Inside magnifying glass 418, a simplified representation of the OEM IMSI is shown as a series of numbers, for example "OEM-12345" 420. Next to magnifying glass 418, a large green checkmark symbol 422 is depicted. This panel illustrates the process of the network validating the OEM IMSI and successfully authenticating the device for the initial connection. Magnifying glass 418 may symbolize the scrutiny applied to the OEM IMSI, while checkmark 422 may represent the successful verification of this temporary identifier.

In the bottom-left panel, smartphone 402 from the earlier panels is redrawn. However, in this panel, both SIM card icons are shown on the screen, with the glowing outline now around Carrier SIM 410 instead of OEM SIM 408. This change in highlighting may indicate the transition from using the OEM IMSI to using the carrier IMSI. From smartphone 402, a solid line is drawn going to cellular tower 412 and then to server racks 414. This line is thicker than the dashed line in the previous panel, potentially symbolizing a more secure connection. The line is labeled "Secure channel established" 424. The use of a solid, thicker line for this connection may visually represent the enhanced security of the channel established using the OEM IMSI authentication.

The bottom-right panel again focuses on server racks 414. In front of server racks 414, a large shield icon 426 is drawn, symbolizing the enhanced security now in place. Next to shield 426, a small, padlocked box or envelope 428 is depicted. On box or envelope 428, the text "Encrypted Carrier IMSI" 430 is written. An arrow is drawn from smartphone 402 to this encrypted package, following the same path as the secure channel line from the previous panel. This final panel illustrates the transmission of the carrier IMSI over the secure channel established in the previous steps, potentially highlighting the protected nature of this sensitive information.

Figure 5:
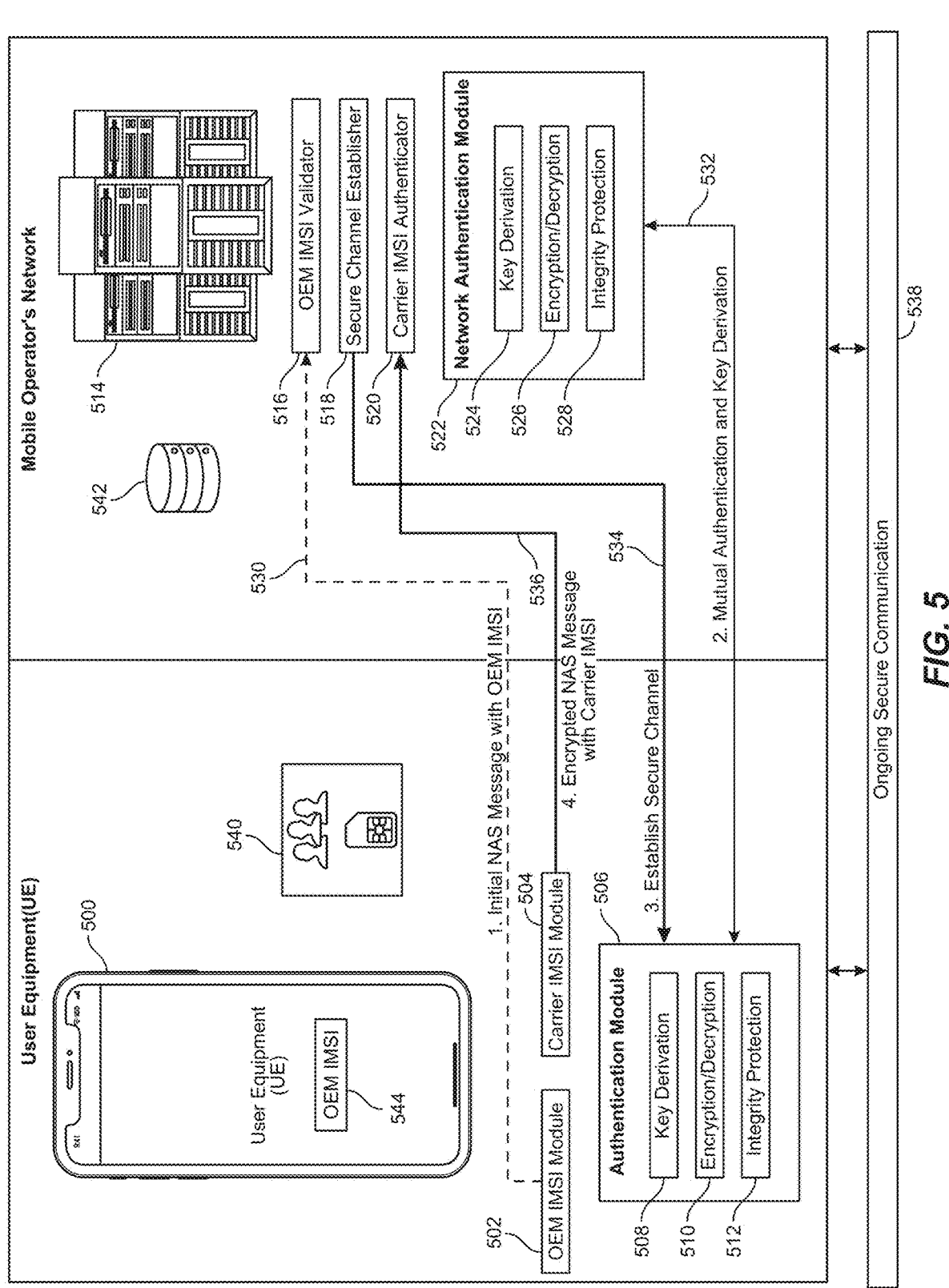
FIG. 5 provides a detailed technical illustration of the two-stage IMSI authentication process, showing the components and data flow in both the UE and the mobile operator's network, in accordance with an embodiment of the present disclosure.

FIG. 5 presents an example detailed technical illustration of an example two-stage IMSI authentication process, showing the components and data flow in both the User Equipment (UE) and the mobile operator's network. This figure may provide a view of an example secure initial attachment process and the subsequent authentication using the carrier IMSI. The illustration is divided into three main sections: the User Equipment (UE) on the left, the Mobile Operator's Network on the right, and the communication flow between them in the center. This layout may help to visualize the parallel processes occurring on both the device and network sides during the authentication procedure, as well as the sequence of interactions between them.

On the left side of the illustration, a large smartphone icon 500 represents the User Equipment (UE). Beneath smartphone 500, two separate boxes are shown: one labeled "OEM IMSI Module" 502 and the other labeled "Carrier IMSI Module" 504. These modules may represent the logical or physical separation of the two IMSIs within the UE. OEM IMSI Module 502 may be embedded in the Mobile Equipment or, in some implementations, stored in the SIM card. The flexibility in the storage location of the OEM IMSI may enable for various implementation strategies depending on the specific requirements of the device manufacturer and mobile operator. Carrier IMSI Module 504 is typically associated with the SIM card provided by the mobile operator. This separation of IMSIs may be a helpful aspect of the enhanced security technique, potentially enabling for the initial authentication to occur without exposing the subscriber's actual identity. Below these modules, a larger box labeled "Authentication Module" 506 is depicted. This module may contain several sub-components crucial for the authentication process. Within Authentication Module 506, three smaller boxes are shown: "Key Derivation" 508, "Encryption/Decryption" 510, and "Integrity Protection" 512. These components may work together to process the authentication challenges, derive necessary keys, and secure the communication channel. The Key Derivation component 508 may be responsible for generating the various cryptographic keys used throughout the authentication process, based on the received challenges and stored secrets. The Encryption/Decryption component 510 may handle the confidentiality protection of the communication, ensuring that sensitive information cannot be read by unauthorized parties. The Integrity Protection component 512 may provide assurance that the messages exchanged have not been tampered with during transmission.

On the right side of the illustration, a cluster of server icons 514 represents the mobile operator's network infrastructure. This may include various elements such as base stations, core network components, and authentication servers. Beneath these servers, three separate boxes are depicted: "OEM IMSI Validator" 516, "Secure Channel Establisher" 518, and "Carrier IMSI Authenticator" 520. These components may correspond to the different stages of the authentication process on the network side. The OEM IMSI Validator 516 may be responsible for verifying the authenticity of the received OEM IMSI and initiating the first stage of the authentication process. The Secure Channel Establisher 518 may handle the creation of an encrypted communication channel based on the keys derived during the initial authentication. The Carrier IMSI Authenticator 520 may manage the second stage of authentication, verifying the subscriber's actual identity using the carrier IMSI. Below these boxes, a larger box labeled "Network Authentication Module" 522 is shown. This module mirrors the structure of the UE's Authentication Module, containing "Key Derivation" 524, "Encryption/Decryption" 526, and "Integrity Protection" 528 components. The similarity in structure between the UE and network authentication modules may highlight the parallel processes occurring on both sides during the authentication, ensuring that both parties may independently derive the same keys and apply consistent security measures to the communication.

In the center of the illustration, the communication flow between the UE and the network is depicted, showing the sequence of messages exchanged during the two-stage authentication process. A dashed arrow from OEM IMSI Module 502 to OEM IMSI Validator 516 is labeled "1. Initial NAS message with OEM IMSI" 530. This arrow may represent the first stage of the authentication process, where the OEM IMSI is sent in clear text. The use of a dashed line for this initial communication may visually indicate the potentially vulnerable nature of this transmission, as it occurs before any security measures are in place. Following this, a solid double-headed arrow between Authentication Module 506 and Network Authentication Module 522 is labeled "2. Mutual Authentication and Key Derivation" 532. This bidirectional communication may represent the exchange of authentication challenges and responses, as well as the derivation of initial security keys. The mutual nature of this authentication step may be an important aspect of the security model, ensuring that both the UE and the network may verify each other's identity. A thick, solid arrow from Secure Channel Establisher 518 to Authentication Module 506 is labeled "3. Establish Secure Channel" 534. This arrow may signify the establishment of an encrypted communication channel based on the keys derived in the previous step. The thickness of this arrow may visually emphasize the enhanced security of this channel compared to the initial communication. Another thick, solid arrow from Carrier IMSI Module 504 to Carrier IMSI Authenticator 520 is labeled "4. Encrypted NAS message with Carrier IMSI" 536. This arrow is drawn over or alongside the "Establish Secure Channel" arrow, potentially indicating that the carrier IMSI is transmitted through the secure channel established in the previous step. This may illustrate a security feature of the two-stage process, where the subscriber's actual identity is only transmitted after a secure channel has been established.

At the bottom of the diagram, a long box spanning the width of the figure is labeled "Ongoing Secure Communication" 538. Bidirectional arrows from both the UE and Network sides into this box may represent the continued secure communication after the two-stage authentication process is complete. This may indicate that the security measures established during the authentication process continue to protect all subsequent communications between the UE and the network. The presence of this ongoing secure communication element in the diagram may highlight the lasting impact of the initial two-stage authentication on the overall security of the mobile connection.

In some examples, method 100 may further include maintaining, by the mobile operator, a database of valid OEM IMSIs and their associated security credentials and validating, by the mobile operator, the first IMSI received in the initial NAS message against the database as a condition for establishing the second channel. FIG. 5 may illustrate this concept in part through database 542, which may store valid OEM IMSIs, as validated by OEM IMSI validator 516.

In further examples, the UE includes an embedded SIM (eSIM) supporting multiple profiles and the first IMSI and the second IMSI are assigned to different profiles on the eSIM. FIG. 5 may illustrate this concept in part using a SIM profile indicator 540, which shows that a corresponding SIM card of UE 500 may store multiple profiles, as shown.

Additionally, or alternatively, in some examples the first IMSI is embedded in the Mobile Equipment. FIG. 5 further illustrates this option using the indicator 544, which indicates that the OEM IMSI may be stored in the User Equipment itself.

Figure 6:
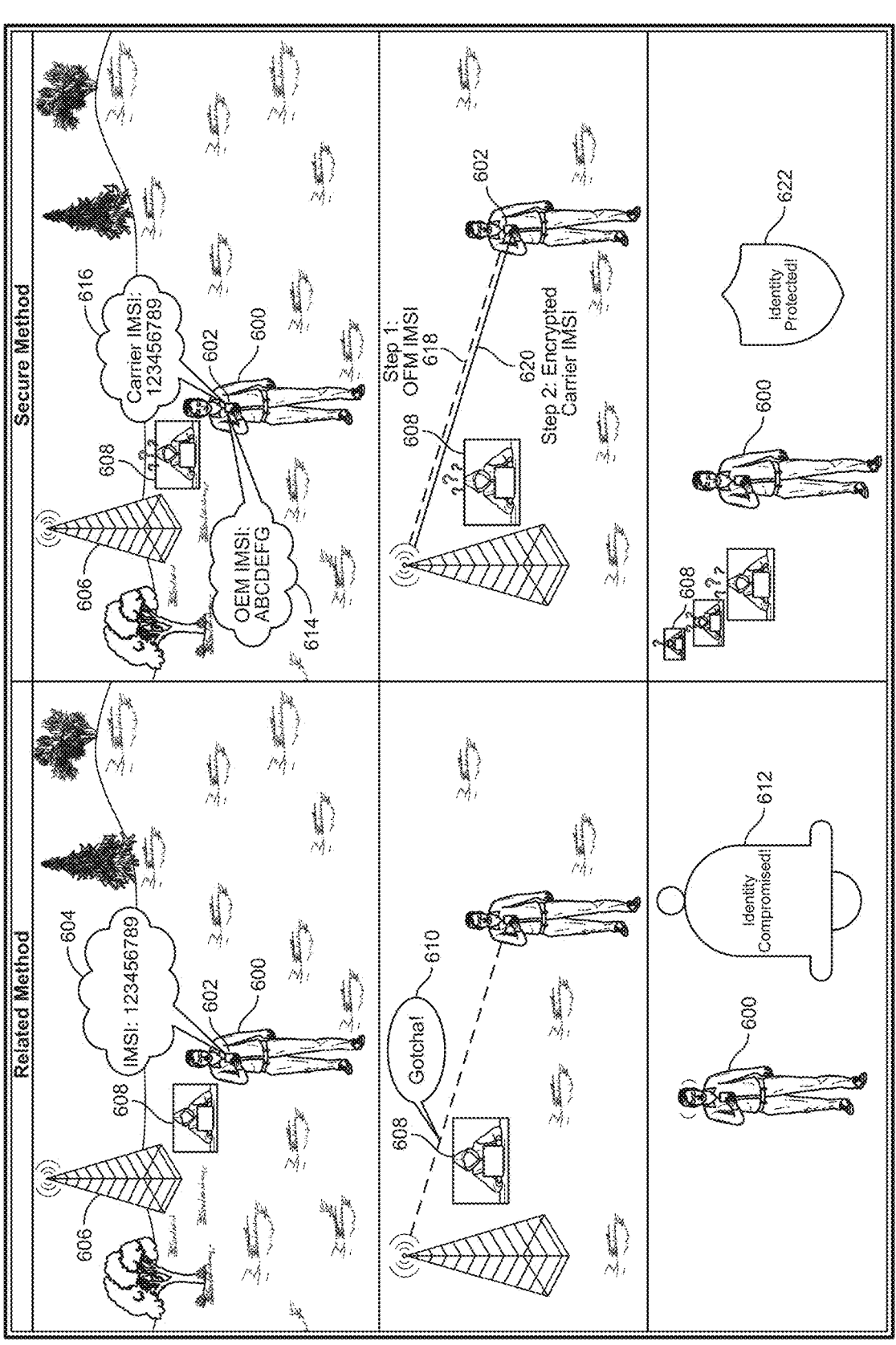
FIG. 6 illustrates a comic-style comparison of traditional IMSI authentication versus the two-stage IMSI authentication process, highlighting the security benefits of the invention, in accordance with an embodiment of the present disclosure.

FIG. 6 presents an example comic-style illustration comparing the related IMSI authentication method with the example two-stage IMSI authentication process, potentially highlighting the security benefits of the latter technique. The figure may be divided into two main sections: "Related Method" on the left side and "Secure Method" on the right side, with each side containing three panels stacked vertically. This visual representation may aim to convey the complex technical concepts in an accessible manner, potentially aiding in the understanding of the security benefits offered by the two-stage authentication process.

In the Related Method section, the top-left panel may depict a person 600 holding a smartphone 602. Person 600 might appear worried or concerned, reflecting the potential security risks associated with traditional IMSI authentication methods. Above smartphone 602, a thought bubble may be visible, containing the text "IMSI: 123456789" 604. This may represent the user's actual IMSI, which in related systems may be vulnerable to interception. In the background of this panel, a cell tower 606 with signal waves emanating from it might be illustrated, representing the mobile network infrastructure. Between person 600 and cell tower 606, a shadowy FIG. 608 with a laptop may be drawn, potentially symbolizing a malicious actor attempting to intercept communications. This layout may visually convey the various elements involved in the related authentication process and the potential security vulnerabilities that may exist.

The middle-left panel of the Related Method section zooms in on the area between smartphone 602 and cell tower 606, providing a more detailed view of the authentication process. A dotted line may be drawn from smartphone 602 to cell tower 606, representing the transmission of the IMSI in clear text. The shadowy FIG. 608 is shown intercepting this dotted line, with a speech bubble saying "Gotcha!" 610. This visual representation may illustrate the vulnerability of transmitting the IMSI without encryption in traditional systems. By depicting the interception process, this panel may effectively communicate the case with which a malicious actor may capture sensitive subscriber information in a traditional authentication scenario.

In the bottom-left panel of the Related Method section, person 600 may be depicted looking distressed, with panic lines potentially drawn around their head to emphasize their concern. Next to person 600, a notification icon with the text "Identity Compromised!" 612 is shown, highlighting the potential consequences of IMSI interception in traditional systems. This final panel in the Related Method section may serve to illustrate the end result of the security vulnerability, emphasizing the potential real-world impact on users when their sensitive information is compromised. The progression from the initial transmission to the final compromised state may provide a clear narrative of the security risks inherent in related authentication methods.

Moving to the Secure Method section on the right side of the illustration, the top-right panel may show the same person 600 holding smartphone 602. Above smartphone 602, two thought bubbles are visible: one containing "OEM IMSI: ABCDEFG" 614 and another containing "Carrier IMSI: 123456789" 616. This visual representation may illustrate the concept of using two separate IMSIs in the Secure Method, a key aspect of the enhanced security technique. In the background, the same cell tower 606 with signal waves may be depicted, maintaining visual consistency with the Related Method section. The shadowy FIG. 608 with the laptop is also included, but looking confused, representing the increased difficulty in intercepting meaningful information. This panel may effectively introduce the elements of the Secure Method, setting the stage for subsequent panels to illustrate the process in more detail.

The middle-right panel of the Secure Method section zooms in on the area between smartphone 602 and cell tower 606, providing a detailed view of the two-stage authentication process. A dashed line from smartphone 602 to cell tower 606 may be drawn, labeled "Step 1: OEM IMSI" 618. This may represent the initial transmission of the temporary OEM IMSI, which may not be directly linked to the subscriber's account. Additionally, a solid, thicker line overlapping the dashed line might be shown, labeled "Step 2: Encrypted Carrier IMSI" 620. This visual representation may illustrate the two-stage process and the enhanced security of transmitting the actual carrier IMSI over an encrypted channel. The shadowy FIG. 608 is again depicted looking at their laptop screen with question marks above their head, indicating their inability to intercept meaningful information. By clearly depicting both stages of the authentication process, this panel may effectively communicate the enhanced security measures and the potential difficulty faced by malicious actors in attempting to intercept sensitive information.

In the bottom-right panel of the Secure Method section, person 600 is shown and is now relieved and happy, contrasting with their distressed appearance in the Related Method section. Next to person 600, a shield icon with the text "Identity Protected!" 622 is depicted, emphasizing the enhanced security provided by the two-stage authentication process. This visual metaphor of a shield may effectively convey the protective nature of the new method. In the background, the shadowy FIG. 608 might be faintly drawn moving away with a disappointed expression, further illustrating the effectiveness of the Secure Method in protecting user identity. This final panel may serve to reinforce the positive outcome of the Secure Method, providing a clear contrast with the compromised scenario depicted in the Related Method section.

Figure 7:
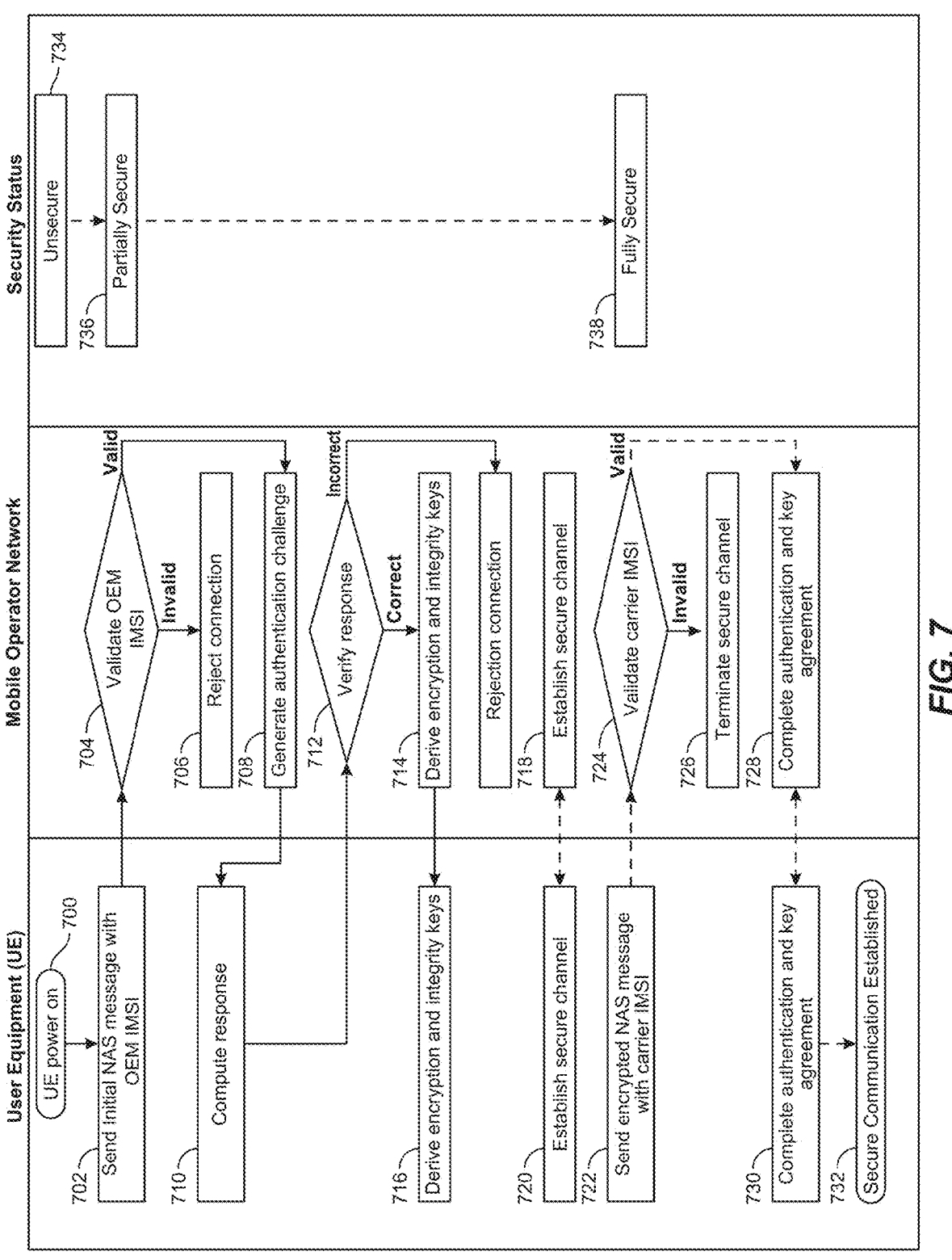
FIG. 7 presents a technical flowchart of the two-stage IMSI authentication process, detailing the steps involved in both the UE and the mobile operator's network, in accordance with an embodiment of the present disclosure.

FIG. 7 presents a technical flowchart of an example of the two-stage IMSI authentication process, detailing the steps involved in both the User Equipment (UE) and the mobile operator's network. The flowchart is divided into three columns: "User Equipment (UE)" on the left, "Mobile Operator Network" in the center, and "Security Status" on the right. This comprehensive diagram illustrates the progression of the authentication process from an unsecured initial state to a fully secure communication channel, highlighting the decision points and actions taken by both the UE and the network throughout the procedure.

The process begins at the top of the diagram with a rounded rectangle 700 labeled "UE Power On". This represents the initial state of the User Equipment as it starts the connection process. From this point, the flowchart branches into parallel paths for the UE and the network, illustrating the interactions between these two entities during the authentication process. In the first stage of OEM IMSI Authentication, the UE column shows a rectangle 702 labeled "Send Initial NAS Message with OEM IMSI". This step represents the UE's first action in the authentication process, where it transmits the OEM IMSI over an unsecured channel. An arrow leads from this to the Network column, to a diamond shape 704 labeled "Validate OEM IMSI". This diamond shape represents a decision point in the process, where the network determines whether the received OEM IMSI is valid. Two arrows lead from this diamond: one labeled "Invalid" points to a rectangle 706 "Reject Connection", indicating the termination of the authentication process if the OEM IMSI is not recognized, while another labeled "Valid" continues to the next step in the authentication process.

Following the "Valid" path, the Network column shows a rectangle 708 "Generate Authentication Challenge". This step represents the network's response to a valid OEM IMSI, where it creates a challenge to verify the UE's authenticity. An arrow leads back to the UE column, to a rectangle 710 "Compute Response". This represents the UE's action in response to the network's challenge, where it performs the necessary calculations to prove its identity. An arrow then leads back to the Network column, to another diamond shape 712 "Verify Response". This second decision point is where the network checks the UE's response to its challenge. Again, two arrows lead from this diamond: one labeled "Incorrect" points to the "Reject Connection" box, indicating that the authentication fails if the UE's response is incorrect, while another labeled "Correct" continues the authentication process.

If the response is correct, the Network column shows a rectangle 714 "Derive Encryption and Integrity Keys". This step represents the network generating the necessary keys for secure communication based on the successful authentication. An arrow leads to the UE column, to a matching rectangle 716 "Derive Encryption and Integrity Keys". This parallel process represents both the network and the UE generating the same set of keys independently, ensuring that both parties have the means to establish a secure communication channel. The secure channel establishment is then represented by rectangles 718 "Establish Secure Channel" in the Network column and 720 "Establish Secure Channel" in the UE column, connected by a bidirectional arrow. This indicates the successful completion of the first stage of authentication and the creation of an encrypted communication path between the UE and the network.

The second stage of the process, involving Carrier IMSI Authentication, begins in the UE column with a rectangle 722 "Send Encrypted NAS Message with Carrier IMSI". This step represents the UE transmitting its actual subscriber identity (Carrier IMSI) over the newly established secure channel. An arrow leads to the Network column, to a diamond shape 724 labeled "Validate Carrier IMSI". This decision point is where the network verifies the authenticity of the Carrier IMSI. As before, two arrows lead from this diamond: one labeled "Invalid" points to a rectangle 726 "Terminate Secure Channel", indicating that the secure connection is closed if the Carrier IMSI is not valid, while another labeled "Valid" continues to the next step.

If the Carrier IMSI is valid, the process continues to a rectangle 728 "Complete Authentication and Key Agreement" in the Network column. A bidirectional arrow connects this to a matching rectangle 730 "Complete Authentication and Key Agreement" in the UE column. This step represents the final phase of the authentication process, where both the UE and the network complete any remaining security procedures and finalize the agreement on the secure communication parameters. The process concludes with a rounded rectangle 732 at the bottom labeled "Secure Communication Established", indicating the successful completion of the two-stage authentication process and the readiness for secure data exchange between the UE and the network.

The Security Status column on the right shows the evolving security level throughout the process. At the start, a box 734 is labeled "Unsecure", representing the initial state before authentication begins. As the authentication process progresses, the security status changes to reflect the increasing level of protection. After the OEM IMSI authentication, a box 736 is labeled "Partially Secure", indicating that an initial level of security has been established. Finally, after the Carrier IMSI authentication is complete, a box 738 is labeled "Fully Secure", representing the highest level of security achieved through the two-stage authentication process.

Figure 8:
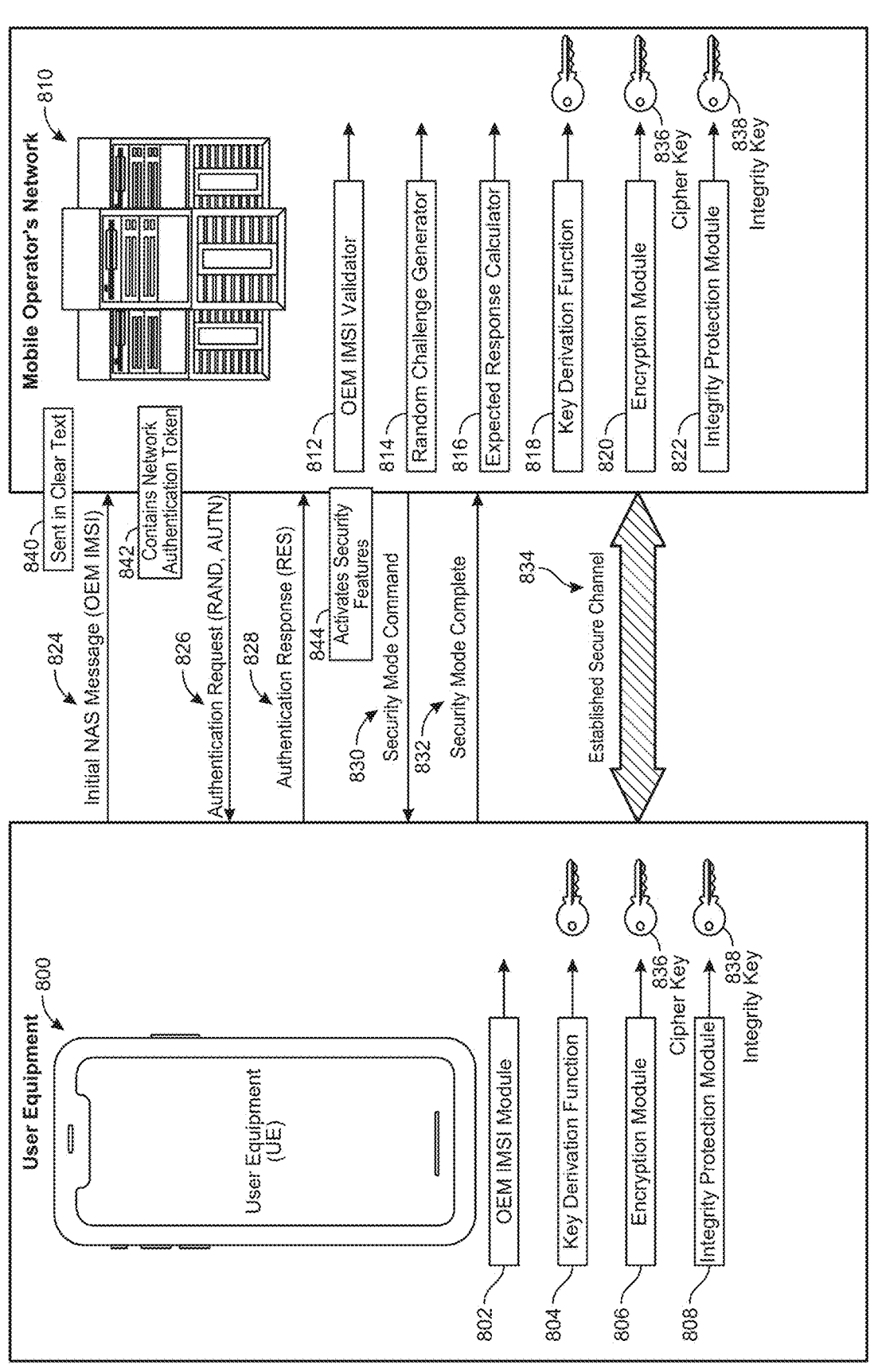
FIG. 8 shows a detailed diagram of the secure channel establishment process, illustrating the key exchange and encryption mechanisms used in the invention, in accordance with an embodiment of the present disclosure.

FIG. 8 presents a detailed diagram of an example of the secure channel establishment process, illustrating the key exchange and encryption mechanisms used in the two-stage IMSI authentication method. The diagram is divided into two main sections: "User Equipment (UE)" on the left and "Mobile Operator Network" on the right, with a central area depicting the sequence of messages exchanged between these two entities. This illustration provides a visual representation of the complex interactions and cryptographic processes that may be involved in establishing a secure communication channel between a mobile device and the network infrastructure.

In the User Equipment (UE) section, a large smartphone icon 800 is shown at the top, representing the mobile device initiating the secure connection process. Beneath this icon, several functional blocks are depicted, each representing a component in the UE's authentication and encryption process. The "OEM IMSI Module" 802 is shown, indicating the storage and management of the OEM IMSI within the device. This module plays a role in the initial stage of the authentication process, providing a temporary identifier that helps protect the user's actual subscriber identity. Adjacent to this, a "Key Derivation Function" block 804 is illustrated, representing the cryptographic algorithms used to generate secure keys based on the authentication parameters. The "Encryption Module" 806 and "Integrity Protection Module" 808 are also depicted, showcasing the UE's capabilities to secure the communication channel once the necessary keys have been derived.

The Mobile Operator Network section on the right side of the diagram mirrors the structure of the UE section, illustrating the network's corresponding components for authentication and secure channel establishment. A cluster of server icons 810 at the top represents the mobile operator's network infrastructure. Below this, an "OEM IMSI Validator" 812 is shown, indicating the network's ability to verify the temporary identifier sent by the UE. A "Random Challenge Generator" 814 is depicted, representing the network's role in creating unpredictable challenges for each authentication attempt, enhancing the security of the process. An "Expected Response Calculator" 816 is also illustrated, showing the network's capacity to verify the UE's response to the authentication challenge. Mirroring the UE's components, the network section also includes a "Key Derivation Function" 818, an "Encryption Module" 820, and an "Integrity Protection Module" 822, all of which may help contribute to the establishment and maintenance of the secure communication channel.

The central area of the diagram illustrates the sequence of messages exchanged between the UE and the network during the secure channel establishment process. This sequence begins with an "Initial NAS Message (OEM IMSI)" 824, represented by an arrow from the UE to the Network. This message contains the temporary OEM IMSI, initiating the authentication process. Following this, an "Authentication Request (RAND, AUTN)" 826 is shown as an arrow from the Network to the UE, representing the challenge sent by the network to verify the UE's identity. The UE's response to this challenge is depicted by the "Authentication Response (RES)" 828 arrow, moving from the UE back to the Network. These initial exchanges form the basis of the mutual authentication process, ensuring that both the UE and the network may verify each other's identities.

After the authentication steps, the diagram shows a "Security Mode Command" 830 arrow from the Network to the UE, followed by a "Security Mode Complete" 832 arrow from the UE back to the Network. These messages represent the negotiation and activation of the specific security features and algorithms that will be used for the secure communication channel. This exchange ensures that both the UE and the network are aligned on the security parameters and ready to begin encrypted communication.

At the bottom of the diagram, a thick, bidirectional arrow 834 labeled "Established Secure Channel" is shown between the UE and Network sections. This arrow, distinct in pattern from the earlier message arrows, represents the final outcome of the secure channel establishment process, which is a protected communication path that may be used for all subsequent data exchanges, including the transmission of the carrier IMSI in the second stage of the authentication process.

The diagram also illustrates the key generation process in both the UE and Network sections. From the "Key Derivation Function" boxes on both sides, arrows point to small key icons labeled "CK (Cipher Key)" 836 and "IK (Integrity Key)" 838. These keys, derived independently by both the UE and the network based on the shared authentication parameters, form the basis of the encryption and integrity protection for the secure channel. Arrows from these key icons to the respective Encryption and Integrity Protection Modules visually represent how these derived keys are used to secure the communication.

To provide additional context and clarity, several annotations are included in the diagram. Next to the "Initial NAS Message", a note 840 states "Sent in clear text", highlighting the initial vulnerability in the process that the two-stage method aims to address. Adjacent to the "Authentication Request", a note 842 indicates that it "Contains network authentication token", emphasizing the mutual nature of the authentication process. Finally, next to the "Security Mode Command", a note 844 explains that this step "Activates security features", clarifying the purpose of this message in the overall process.

Figure 9:
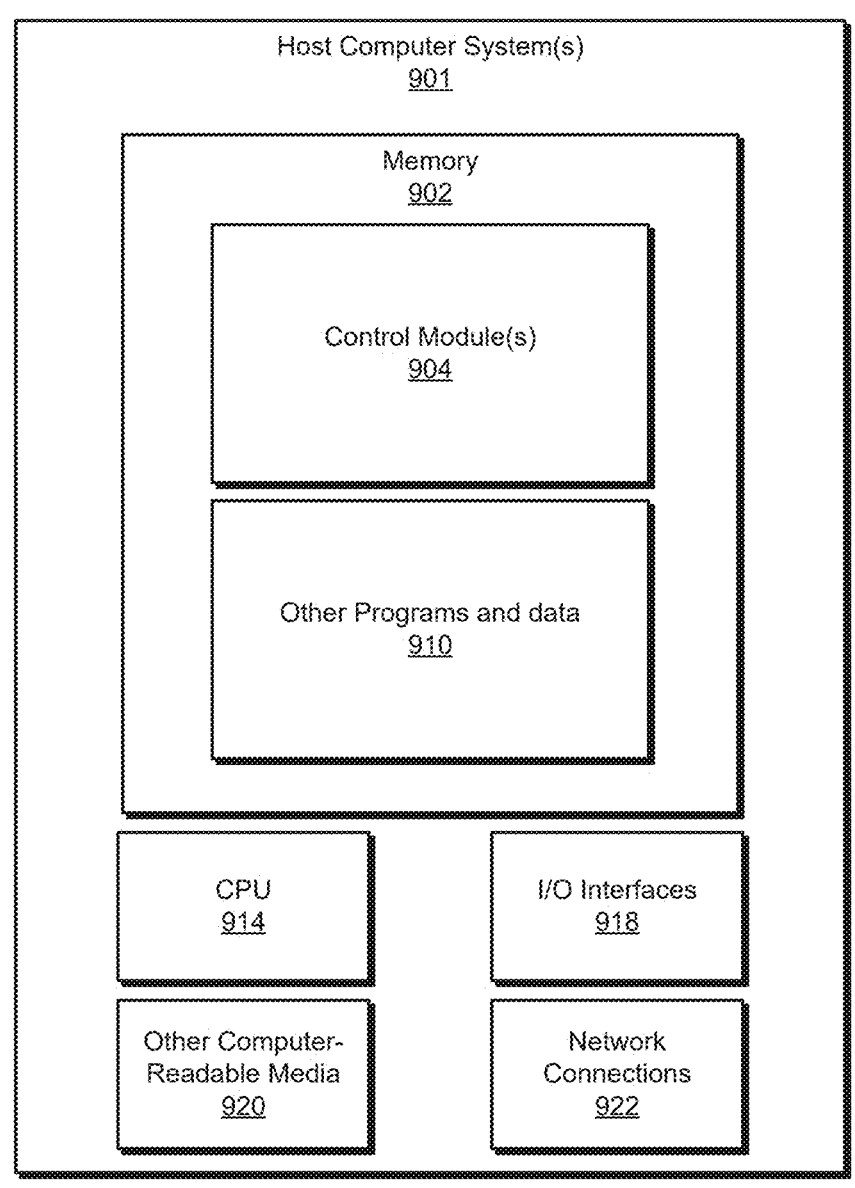
FIG. 9 illustrates a block diagram of an exemplary computer system suitable for implementing various aspects of the invention, in accordance with an embodiment of the present disclosure.

FIG. 9 shows a system diagram that describes an example implementation of a computing system(s) for implementing embodiments described herein. The functionality described herein may be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, enabling higher deployment agility and flexibility. However, FIG. 9 illustrates an example of underlying hardware on which such software and functionality may be hosted and/or implemented.

In particular, shown is example host computer system(s) 901. For example, such computer system(s) 901 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems or components described herein. Memory 902 may also store other programs and data 910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include a video interface, other data input or output interfaces, or the like. Other computer-readable media 920 may include other types of stationary or removable computer-readable media, such as removable flash drives, external hard drives, or the like.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI;

establishing, by the server of the mobile operator based on the first IMSI in the initial NAS message, a second channel with the UE that is encrypted; and receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

2. The method of claim 1, wherein establishing the second channel based on the first IMSI comprises deriving, by the server of the mobile operator, encryption and integrity keys based on the first IMSI for use in establishing the second channel.

3. The method of claim 2, wherein the subsequent NAS message is encrypted using the encryption keys derived from the first IMSI.

4. The method of claim 1, wherein the first IMSI is not linked to any subscribed services in the mobile operator's subscriber database.

5. The method of claim 1, wherein the second channel is established in compliance with the 3GPP TS 33.401 specification.

6. The method of claim 1, wherein the method is performed by a Mobility Management Entity (MME) for 4G networks or a Serving GPRS Support Node (SGSN) for 3G networks.

7. The method of claim 1, further comprising:

maintaining, by the mobile operator, a database of valid OEM IMSIs and their associated security credentials; and validating, by the mobile operator, the first IMSI received in the initial NAS message against the database as a condition for establishing the second channel.

8. The method of claim 1, further comprising performing an authentication process, by the server of the mobile operator, comprising:

generating a random challenge for authenticating the UE using the first IMSI or the second IMSI;

sending the random challenge to the UE;

receiving a response from the UE; and authenticating the UE based on the response such that successful authentication results in establishing the second channel for the first IMSI or maintaining the second channel for the second IMSI.

9. The method of claim 8, wherein the authentication process further comprises computing, by the server of the mobile operator, an expected response (XRES) based on the random challenge and a secret key associated with the first IMSI or the second IMSI.

10. The method of claim 8, wherein the authentication process complies with the Authentication and Key Agreement (AKA) protocol.

11. The method of claim 1, further comprising generating, by the server of the mobile operator, a new set of security keys based on the second IMSI after receiving the subsequent NAS message.

12. The method of claim 1, wherein:

the UE includes an embedded SIM (eSIM) supporting multiple profiles; and the first IMSI and the second IMSI are assigned to different profiles on the eSIM.

13. The method of claim 1, wherein the first IMSI is stored in one of: Mobile Equipment of the UE, an embedded SIM (eSIM) of the UE, or a physical SIM card of the UE.

14. The method of claim 13, wherein the first IMSI is embedded in the Mobile Equipment.

15. The method of claim 1, wherein the initial NAS message containing the first IMSI is sent in unencrypted clear text in compliance with the initial attach procedure defined in the 3GPP TS 33.401 specification for 4G networks or the 3GPP TS 33.102 specification for 3G networks.

16. The method of claim 1, further comprising performing, by the server of the mobile operator, a security mode command exchange with the UE to establish integrity protection for subsequent communications.

17. A non-transitory computer-readable medium that has instructions stored thereon that, when executed by at least one physical computing processor, cause a computing device to perform operations comprising:

receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI;

establishing, by the server of the mobile operator based on the first IMSI in the initial NAS message, a second channel with the UE that is encrypted; and receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

18. The non-transitory computer-readable medium of claim 17, wherein establishing the second channel based on the first IMSI comprises deriving, by the server of the mobile operator, encryption and integrity keys based on the first IMSI for use in establishing the second channel.

19. A system comprising:

at least one physical computing processor of a computing device; and a non-transitory computer-readable medium that has instructions stored thereon that, when executed by the at least one physical computing processor, cause the computing device to perform operations comprising:

receiving, by a server of a mobile operator across a first channel, a first International Mobile Subscriber Identity (IMSI) in an initial Non-Access Stratum (NAS) message from a User Equipment (UE) in which an Original Equipment Manufacturer (OEM) embedded the first IMSI such that a second IMSI that the mobile operator provisioned to a subscriber is protected by the first IMSI initially substituting for the second IMSI;

establishing, by the server of the mobile operator based on the first IMSI in the initial NAS message, a second channel with the UE that is encrypted; and receiving, by the server of the mobile operator from the UE over the second channel that is encrypted and in response to establishing the second channel with the UE in which the Original Equipment Manufacturer (OEM) embedded the first IMSI, a subsequent NAS message that includes the second IMSI that the mobile operator provisioned to the subscriber.

20. The system of claim 19, wherein establishing the second channel based on the first IMSI comprises deriving, by the server of the mobile operator, encryption and integrity keys based on the first IMSI for use in establishing the second channel.

* * * * *